UNITED STATES PATENT OFFICE.

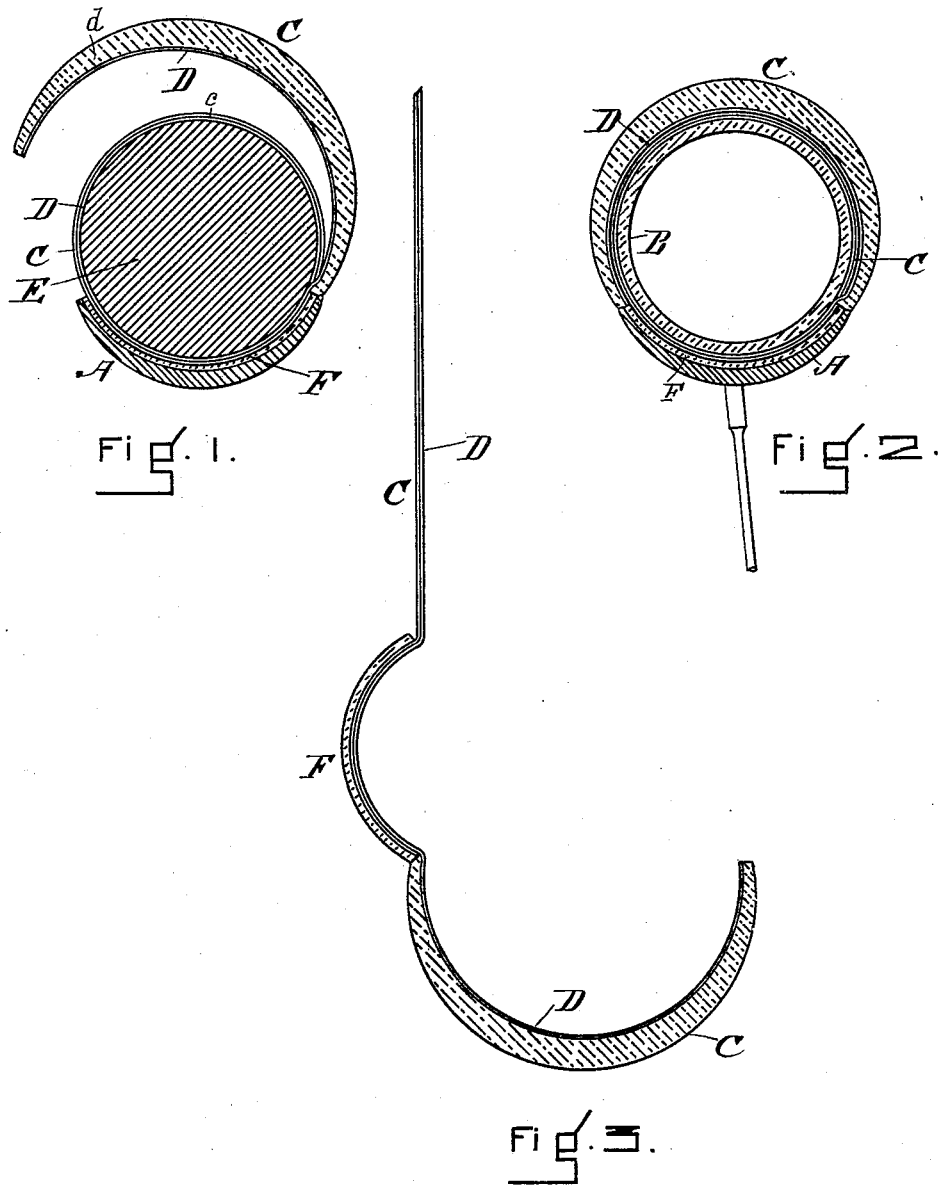

WALTER B. HARDY, OF BOSTON, MASSACHUSETTS, ASSIGNOR TO THE REVERE RUBBER COMPANY, OF SAME PLACE.

PNEUMATIC TIRE.

SPECIFICATION forming part of Letters Patent No. 487,669, dated December 6, 1892.

Application filed July 9, 1892. Serial No. 439,457. (No model.)

*To all whom it may concern:*

Be it known that I, WALTER B. HARDY, of Boston, in the county of Suffolk and State of Massachusetts, have invented certain new and useful Improvements in Pneumatic Tires, of which the following, taken in connection with the accompanying drawings, is a specification.

This invention relates to inflatable tires for bicycles and tricycles, the object being to so construct them as to lessen the danger of leakage of air and to facilitate repair.

My invention consists in a tire having an inflatable inner tube and a wrapper suitably secured to the rim with flaps each side thereof adapted to be folded successively around the inner tube while in position on the wheel-rim, such flaps thus forming, outside of the inner tube, a body or tread portion made up of two thicknesses or flaps successively applied and secured. These flaps are of such breadth as to reach around the inner tube and to the opposite edges of the rim, and are made of vulcanized rubber lined or reinforced by firm flexible canvas. The rubber is vulcanized while the wrapper is bent around a core or form corresponding to the inflated inner tube, so that its normal tendency is to clasp the tube. The core or form is a continuous elastic body, circular in cross-section or in two rigid semicircular parts, so that it may be removed when the flaps have been lifted or turned back, the canvas lining of the outer flap preventing any strong adhesion to the rubber of the inner flap. When the inflatable tube is substituted for the core, the flaps are restored to position and secured in any suitable manner, as by cement, hooks, or lacings. I prefer to apply a much thicker body of rubber on the outer flap than on the inner to constitute the tread-surface of the tire and also to use beneath the wrapper proper an extra strip of rubber and canvas lying along the valley of the rim to give special firmness to this base of the tire.

In the drawings, Figure 1 represents in cross-section the rim, the core, and the rubber and canvas wrapper being applied thereto. Fig. 2 is a transverse section of the tube complete. Fig. 3 represents the wrapper detached and extended.

A represents the wheel-rim having a suitable transverse curvature to receive in its sunken periphery my improved tire.

B is the inflatable inner tube, made of vulcanized rubber in any approved form, either a plain tubular ring or one of the so-called "non-puncturable" tubes, in which the outermost portion nearest to the tread is held under compression, so that any small perforations made therein will be closed by the internal pressure.

C D is the wrapper, to which my invention more particularly relates, C being the rubber portion and D the canvas lining thereof, which reinforces and gives stability to it. I furnish an extra strip F of rubber and canvas beneath the wrapper proper and lying along the valley of the rim to give additional body to this portion of the wrapper. This wrapper is secured to the concave rim A in a firm manner either by vulcanizing or cementing it along its longitudinal center to the concave face of the rim, or by riveting it thereto, or by means of studs or hooks, as may be preferred. The vulcanizing may be readily effected by first coppering the face of the rim, then applying thereto the rubber portion C or F while in the raw state, then pressing the central part of the wrapper to the rim by the cylindrical-curved core E, then wrapping the flaps *c d* successively around the core, and inclosing the whole in the circular mold and subjecting the rubber to the vulcanizing process. The vulcanizing of the rubber while the wrapper is wrapped around the core and confined by the mold fixes its normal position to coincide with that which it occupies when in use, or, in other words, gives it a tendency to retain the same form in cross-section which it had when vulcanized. Hence the flaps will tend to embrace the inner tube and a moderate force will hold them in place after said tube has been introduced in place of the core E, around which the wrapper was formed. In removing the core the edges of the flaps will be loosened from the rubber beneath them, and they will be turned back enough to release the core and insert the deflated tube. Then the tube may be wholly or partially inflated and the flaps wrapped around and secured to it.

The wrapper may be made upon the rim of the wheel on which it is to be used, or, as represented in Fig. 1, upon a similarly-shaped rim without spokes, from which, after vulcanizing, it is removed and shipped to be applied upon the wheel-rim. Cement may be employed to stick the flaps down, or for the outer flap any preferred mechanical means may be used.

I claim as my invention—

1. In a pneumatic tire, an inflatable inner tube, in combination with a wrapper formed of canvas and rubber, the flaps of which are successively wrapped around the outer face of the inner tube and secured around the same, so that a tread portion is provided made up of the superposed flaps of said wrapper embracing the inner tube, substantially as set forth.

2. The concave metallic rim A, the inflatable inner tube B, and the wrapper C D, secured longitudinally along said rim and having flaps c d, each extending from the edge of the rim around the tube B and successively secured thereon, substantially as set forth.

3. The described method of forming pneumatic tires, consisting in first applying to a peripherally-concave rim a wrapper composed of rubber compound and canvas, the rubber portion being in contact with the rim, then pressing such wrapper along its central portion closely against said rim by means of a circular core or form and wrapping its flaps or edges around said core and inclosing the whole in a mold or envelope, then vulcanizing the rubber while so confined, subsequently raising said flaps, removing said core, and substituting therefor an inflatable inner tube and then wrapping the flaps successively around the outer portion of said tube and securing them in place, substantially as set forth.

In testimony whereof I have signed my name to this specification, in the presence of two subscribing witnesses, on this 24th day of June, A. D. 1892.

WALTER B. HARDY.

Witnesses:
A. H. SPENCER,
W. H. GLEASON.